(12) United States Patent
Miyazawa

(10) Patent No.: US 12,517,187 B2
(45) Date of Patent: Jan. 6, 2026

(54) METHOD OF EVALUATING POWER STORAGE DEVICE, JIG SET, AND METHOD OF PRODUCING POWER STORAGE DEVICE

(71) Applicant: TOYOTA JIDOSHA KABUSHIKI KAISHA, Toyota (JP)

(72) Inventor: Kensaku Miyazawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 147 days.

(21) Appl. No.: 18/584,577

(22) Filed: Feb. 22, 2024

(65) Prior Publication Data

US 2024/0302454 A1    Sep. 12, 2024

(30) Foreign Application Priority Data

Mar. 10, 2023   (JP) .................................. 2023-037362

(51) Int. Cl.
  *G01R 31/12*   (2020.01)
  *G01R 31/64*   (2020.01)

(52) U.S. Cl.
  CPC .................................. *G01R 31/64* (2020.01)

(58) Field of Classification Search
  CPC ........ G01R 31/36; G01R 31/52; G01R 31/64; G01R 31/3865; Y02E 60/10
  See application file for complete search history.

(56) References Cited

U.S. PATENT DOCUMENTS

| | | | | |
|---|---|---|---|---|
| 2015/0072197 | A1* | 3/2015 | Sawanishi | H01M 50/553 429/90 |
| 2019/0162771 | A1* | 5/2019 | Miyazawa | H02J 7/0069 |
| 2019/0195959 | A1* | 6/2019 | Ishihara | H01M 10/4285 |
| 2020/0166580 | A1* | 5/2020 | Jung | G01R 31/389 |
| 2020/0328424 | A1* | 10/2020 | Yamada | H01M 4/628 |

FOREIGN PATENT DOCUMENTS

| | | |
|---|---|---|
| JP | 2019-102169 A | 6/2019 |
| JP | 2020-191181 A | 11/2020 |

\* cited by examiner

*Primary Examiner* — Thang X Le
(74) *Attorney, Agent, or Firm* — Sughrue Mion, PLLC

(57) ABSTRACT

A method of evaluating a power storage device comprises the following (a) to (d) in this order: (a) placing a metal piece on an outer surface of an electrode assembly; (b) pushing the metal piece into the electrode assembly; (c) detecting a short circuit based on a change in potential difference between an electrode inside the electrode assembly and the metal piece; and (d) stopping the pushing the metal piece. The (b) includes using a push jig and a guide jig. The guide jig is provided with a through hole. The push jig is inserted into the through hole. The metal piece has a ring shape. The metal piece is placed inside the through hole. A hardness of the push jig is equal to or more than a hardness of the metal piece.

6 Claims, 15 Drawing Sheets

FIG.19

Table of configuration of test products

| Shape | Prismatic battery |
|---|---|
| Rated capacity | 5Ah, 50Ah, 100Ah, 200Ah |
| Exterior member | Case (made of Al alloy) |
| Electrode assembly | Electrode winding assembly |
| Positive electrode active material | Lithium-containing nickel-cobalt-manganese composite oxide |
| Negative electrode active material | Graphite |
| Separator | Porous film made of resin (three-layer structure) |

FIG. 20

| | | Capacity/Ah | Experiment results | | |
|---|---|---|---|---|---|
| | | | Number of short-circuited layers | Melt diameter | Voltage decrement |
| No.1 | Method: IEC62660-3<br>Push jig: Acrylic resin<br>Metal piece: L-shaped, made of Ni<br>Short circuit detection:<br>Terminal-to-terminal voltage | 5 | 1 (10/10) | Φ(10/10) | δ(10/10) |
| | | 50 | 1 (7/10), 0 (3/10) | Φ(7/10), 0 (3/10) | δ(7/10), N (3/10) |
| | | 100 | 1 (2/10), 0 (8/10) | Φ(2/10), 0 (8/10) | δ(2/10), N (8/10) |
| | | 200 | 1 (1/10), 0 (9/10) | Φ(1/10), 0 (9/10) | δ(1/10), N (9/10) |
| No.2 | Method: JP2020-191181<br>Push jig: Bakelite<br>Metal piece: Ring-shaped, made of SUS<br>Short circuit detection:<br>Terminal-to-terminal voltage | 5 | 1 (10/10) | 2Φ(10/10) | δ(7/10), 2δ(3/10) |
| | | 50 | 1 (10/10) | 2Φ(10/10) | δ(7/10), 2δ(3/10) |
| | | 100 | 3 (10/10) | 2Φ(10/10) | 2δ(7/10), 3δ(3/10) |
| | | 200 | 5 (10/10) | 3Φ(10/10) | 4δ(10/10) |
| No.3 | Method: Present evaluation method<br>Push jig:<br>Metal rod (solid material)<br>Metal piece: Ring-shaped, made of SUS<br>Short circuit detection:<br>Potential difference<br>([Positive electrode]−[Metal piece]) | 5 | 1 (10/10) | 0.5Φ(10/10) | 0.5δ(10/10) |
| | | 50 | 1 (10/10) | 0.5Φ(10/10) | 0.5δ(10/10) |
| | | 100 | 1 (10/10) | 0.5Φ(10/10) | 0.5δ(10/10) |
| | | 200 | 1 (10/10) | 0.5Φ(10/10) | 0.5δ(10/10) |
| No.4 | Method: Present evaluation method<br>Push jig:<br>Metal rod (hollow material)<br>Metal piece: Ring-shaped, made of SUS<br>Short circuit detection:<br>Potential difference<br>([Positive electrode]−[Metal piece]) | 5 | 1 (10/10) | Φ(10/10) | δ(10/10) |
| | | 50 | 1 (10/10) | Φ(10/10) | δ(10/10) |
| | | 100 | 1 (10/10) | Φ(10/10) | δ(10/10) |
| | | 200 | 1 (10/10) | Φ(10/10) | δ(10/10) |

METHOD OF EVALUATING POWER STORAGE DEVICE, JIG SET, AND METHOD OF PRODUCING POWER STORAGE DEVICE

CROSS REFERENCE TO RELATED APPLICATIONS

This nonprovisional application is based on Japanese Patent Application No. 2023-037362 filed on Mar. 10, 2023, with the Japan Patent Office, the entire contents of which are hereby incorporated by reference.

BACKGROUND OF THE DISCLOSURE

Field

The present disclosure relates to a method of evaluating a power storage device, a jig set, and a method of producing a power storage device.

Description of the Background Art

Japanese Patent Laying-Open No. 2020-191181 discloses a method of evaluating a power storage device.

SUMMARY OF THE DISCLOSURE

There is a demand for simulation of micro short-circuiting which can be caused by foreign object contamination. Conventionally, simulation of a micro short circuit is carried out by "Forced internal short circuit test" specified in IEC62660-3. A power storage device comprises an electrode assembly. In the forced internal short circuit test, the electrode assembly in a charged state is partly disassembled, and a metal piece (a simulated foreign object) is placed inside the electrode assembly. The metal piece has an L-shaped outer profile. This procedure is very difficult to implement and needs to be taken care of by a skilled, experienced person. A test method that does not require skills or experience is demanded.

Japanese Patent Laying-Open No. 2020-191181 proposes simulating a micro short circuit by pushing a metal piece into an electrode assembly from the outside of the electrode assembly. This method has the following advantages. It does not require disassembling the electrode assembly. It uses a ring-shaped metal piece, and therefore the posture of the metal piece is stably maintained, allowing for a high success rate of pushing-into. It uses a push jig and a guide jig, lowering the difficulty of the procedure. However, it also has the following two issues which have room for improvement.

A first issue is that the detection of a short circuit relies on a voltage drop in the power storage device. As the capacity of the power storage device is increased, a voltage decrement caused by a short circuit becomes smaller. Because of this, as the capacity of the power storage device is increased, detection of a short circuit becomes difficult. At the time when a voltage drop is detected, there is a possibility that the metal piece can have already penetrated through two or more separator layers. Usually, a micro short circuit caused by foreign object contamination is "a single-layer short circuit". A single-layer short circuit occurs when a foreign object penetrates through a single separator layer. Simulation of a single-layer short circuit is demanded. Penetration by a metal piece through two or more separator layers is different from single-layer short-circuiting.

A second issue is that the push jig is made of resin. There is a possibility that the push jig can be softer than the metal piece. In that case, the pushing load tends not to be transferred to the metal piece, and rather tends to escape to the push jig. As a result, the metal piece can be pushed into the electrode assembly not very smoothly, and at the moment when the metal piece penetrates through the outermost layer of the electrode assembly, the metal piece can be pushed into very quickly with a strong force. As a consequence, there is a possibility that the metal piece can penetrate through two or more separator layers.

An object of the present disclosure is to improve reproducibility of single-layer short-circuiting.

Hereinafter, the technical configuration and effects of the present disclosure will be described. It should be noted that the action mechanism according to the present specification includes presumption. The action mechanism does not limit the technical scope of the present disclosure.

1. In a method of evaluating a power storage device, a power storage device including an electrode assembly is evaluated.

The method of evaluating a power storage device comprises the following (a) to (d) in the following order:

(a) placing a metal piece on an outer surface of the electrode assembly;

(b) pushing the metal piece into the electrode assembly;

(c) detecting a short circuit based on a change in potential difference between an electrode inside the electrode assembly and the metal piece; and (d) stopping the pushing the metal piece.

The (b) includes using a push jig and a guide jig. The guide jig is provided with a through hole. The push jig is inserted into the through hole. The metal piece has a ring shape. The metal piece is placed inside the through hole. The push jig pushes the metal piece out of the through hole and thereby the metal piece is pushed into the electrode assembly.

The push jig is electrically conductive. A hardness of the push jig is equal to or more than a hardness of the metal piece.

In the method of evaluating a power storage device according to the present disclosure, detection of a short circuit is based on a change in potential difference between the electrode (either a positive electrode or a negative electrode) and the metal piece (a simulated foreign object). The amount of change in potential difference between the electrode and the metal piece tends not to be affected by the capacity of the power storage device. Hence, even when the capacity of the power storage device is increased, a single-layer short circuit may be detected accurately.

In the method of evaluating a power storage device according to the present disclosure, the push jig is electrically conductive. By measuring the electric potential of the push jig which is in contact with the metal piece, it is possible to measure the electric potential of the metal piece.

Furthermore, the push jig is as hard as or harder than the metal piece. The pushing load tends not to escape to the push jig, and as a result, the metal piece may be pushed into the electrode assembly smoothly.

Due to the synergistic effect of the above-described actions, reproducibility of single-layer short-circuiting is expected to be improved.

2. The method of evaluating a power storage device according to "1" above may include the following configuration.

The push jig has a hollow rod shape.

When a short-circuit current flows through the metal piece, Joule heat is generated. The Joule heat melts the separator, at and around the position of the metal piece. Hereinafter, the diameter of a hole that is formed by the melting of the separator is referred to as "a melt diameter". The larger the melt diameter is, the greater the amount of change in potential difference between the electrode and the metal piece may be. This means that the accuracy of short circuit detection is expected to be enhanced. However, if the heat escapes from the metal piece toward the push jig, there is a possibility that the melt diameter can become smaller. The heat capacity of a hollow material is lower than that of a solid material. When the push jig is a hollow material, heat escape to the push jig is expected to be reduced. That is, accuracy of short circuit detection is expected to be enhanced.

3. The method of evaluating a power storage device according to "1" or "2" above may include the following configuration. The metal piece has a first end face and a second end face. The second end face is a face opposite to the first end face. In the (b), the push jig comes into contact with the second end face. An area of contact between the push jig and the second end face is smaller than an area of the second end face.

With the area of contact between the push jig and the metal piece being small, heat escape from the metal piece toward the push jig is expected to be reduced. That is, accuracy of short circuit detection is expected to be enhanced.

4. The method of evaluating a power storage device according to any one of "1" to "3" above may include the following configuration. The push jig is made of metal.

There may be a wide variety of metal materials that are harder than the metal piece and electrically conductive. As a matter of course, as long as it is harder than the metal piece and electrically conductive, the material of the push jig is not particularly limited to a metal material.

5. A jig set is used in the method of evaluating a power storage device according to any one of "1" to "4" above. The jig set includes the push jig and the guide jig.

6. A method of producing a power storage device comprises the following (A) and (B) in this order:
(A) producing a power storage device; and
(B) evaluating the power storage device.

The (B) includes the method of evaluating a power storage device according to any one of "1" to "4" above.

Next, an embodiment of the present disclosure (which may also be simply called "the present embodiment" hereinafter) and an example of the present disclosure (which may also be simply called "the present example" hereinafter) will be described. It should be noted that neither the present embodiment nor the present example limits the technical scope of the present disclosure. The present embodiment and the present example are illustrative in any respect. The present embodiment and the present example are non-restrictive. The technical scope of the present disclosure encompasses any modifications within the meaning and the scope equivalent to the terms of the claims. For example, it is originally planned that certain configurations of the present embodiment and the present example can be optionally combined.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 19 is a table showing the configuration of test products.

FIG. 20 is a table showing experiment results.

DESCRIPTION OF THE PREFERRED EMBODIMENTS

<Description of Terms>

Figure 1:
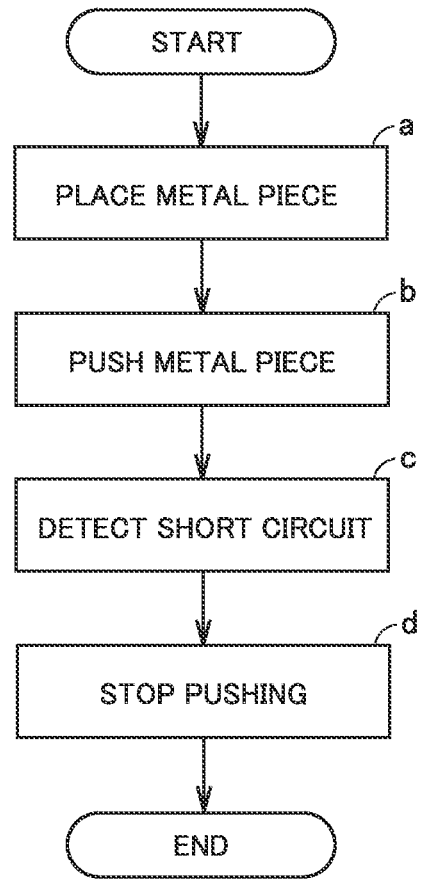
FIG. 1 is a schematic flowchart illustrating a method of evaluating a power storage device according to the present embodiment.

A description will be provided for terms that are used in the present specification. Terms that are not described here may be described in the specification when the term is used.

Expressions such as "comprise", "include", and "have", and other similar expressions (such as "be composed of", for example) are open-ended expressions. In an open-ended expression, in addition to an essential component, an additional component may or may not be further included. The expression "consist of" is a closed-end expression. However, even when a closed-end expression is used, impurities present under ordinary circumstances as well as an additional element irrelevant to the technique according to the present disclosure are not excluded. The expression "consist essentially of" is a semiclosed-end expression. A semiclosed-end expression tolerates addition of an element that does not substantially affect the fundamental, novel features of the technique according to the present disclosure.

Expressions such as "may" and "can" are not intended to mean "must" (obligation) but rather mean "there is a possibility" (tolerance).

Regarding a plurality of steps, operations, processes, and the like that are included in various methods, the order for implementing those things is not limited to the described order, unless otherwise specified. For example, a plurality of steps may proceed simultaneously. For example, a plurality of steps may be implemented in reverse order.

Any geometric term (such as "parallel", "vertical", and "orthogonal", for example) should not be interpreted solely in its exact meaning. For example, "parallel" may mean a geometric state that is deviated, to some extent, from exact "parallel". Any geometric term herein may include tolerances and/or errors in terms of design, operation, production, and/or the like. The dimensional relationship in each figure may not necessarily coincide with the actual dimensional relationship. The dimensional relationship (in length, width, thickness, and the like) in each figure may have been changed for the purpose of assisting understanding for the readers. Further, a part of a given configuration may have been omitted.

A numerical range such as "from m to n %" includes both the upper limit and the lower limit, unless otherwise specified. That is, "from m to n %" means a numerical range of "not less than m % and not more than n %". Moreover, "not less than m % and not more than n %" includes "more than m % and less than n %". Further, any numerical value selected from a certain numerical range may be used as a new upper limit or a new lower limit. For example, any numerical value from a certain numerical range may be combined with any numerical value described in another location of the present specification or in a table or a drawing to set a new numerical range.

All the numerical values are regarded as being modified by the term "about". The term "about" may mean±5%, ±3%, ±1%, and/or the like, for example. Each numerical value may be an approximate value that can vary depending on the implementation configuration of the technique according to the present disclosure. Each numerical value may be expressed in significant figures. Unless otherwise specified, each measured value may be the average value obtained from multiple measurements performed. The number of measurements may be 3 or more, or may be 5 or more, or may be 10 or more. Generally, the greater the number of measurements is, the more reliable the average value is expected to be. Each measured value may be rounded off based on the number of the significant figures. Each measured value may include an error occurring due to an identification limit of the measurement apparatus, for example.

"Electrode" collectively refers to a positive electrode and a negative electrode. An electrode may be either a positive electrode or a negative electrode.

"Hardness" is expressed by a value that is measurable for both a metal piece and a push jig. For example, in the case where the push jig is made of metal, the hardness of the metal piece and the push jig may be expressed by a Vickers hardness, for example. "Vickers hardness" may be measured by the procedure described below. A pyramid-shaped indenter made of diamond is pressed against the surface of a sample with a test force (F) to form an indentation. With the use of a microscope, the length of a diagonal line of the indentation is measured. From the length of the diagonal line, the surface area (S) of the indentation is determined. The test force (F) is divided by the surface area (S), and thereby the Vickers hardness is determined.

For example, the hardness of the metal piece and the push jig may be expressed by tensile yield stress. "Tensile yield stress" may be measured by the procedure described below. A sample is formed into a dumbbell-like shape to prepare a test piece. Tensile stress is applied in the axial direction (the longitudinal direction) of the test piece until the test piece becomes broken. Upper yield stress on a stress-strain diagram is divided by the cross-sectional area of the test piece, and thereby the tensile yield stress is determined.

"The push jig that is electrically conductive" includes a push jig that is electrically conductive as a whole as well as a push jig that is partially electrically conductive. For example, only the surface of the push jig may be electrically conductive. When a material that constitutes at least part of the surface of the push jig has a resistivity of $10^8$ Ωcm or less, the push jig is regarded as being electrically conductive.

<Method of Evaluating Power Storage Device>

FIG. 1 is a schematic flowchart illustrating a method of evaluating a power storage device according to the present embodiment. Hereinafter, "the method of evaluating a power storage device according to the present embodiment" may also be simply called "the present evaluation method". The present evaluation method includes "(a) placing a metal piece", "(b) pushing the metal piece", "(c) detecting a short circuit", and "(d) stopping pushing". Each procedure in the present evaluation method may be carried out in an environment at a low dew point, for example. Each procedure may be carried out in an environment at a constant temperature, for example.

<(a) Placing Metal Piece>

The present evaluation method includes placing a metal piece on an outer surface of the electrode assembly. A power storage device to be evaluated is prepared. The details of the power storage device will be described below. For example, SOC of the power storage device may be adjusted. "SOC (State Of Charge)" refers to a percentage of remaining capacity of a power storage device with respect to its rated capacity. SOC may be adjusted to 50% or more, or 60% or more, or 70% or more, or 80% or more, or 90% or more, or 100% or more, for example. SOC may be adjusted to 120% or less, or 110% or less, or 100% or less, for example.

The power storage device includes an exterior member. The exterior member accommodates the electrode assembly. After SOC is adjusted, the exterior member may be opened and thereby the entirety of the electrode assembly may be taken out from the exterior member. For example, a portion of the exterior member may be removed to expose a portion of the outer surface of the electrode assembly (see FIG. 18).

Figure 2:
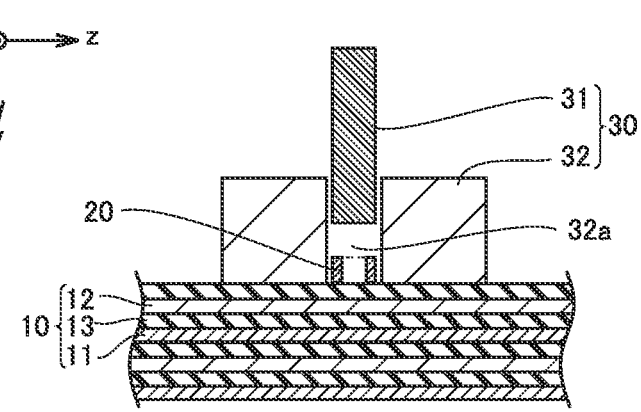
FIG. 2 is a conceptual view illustrating placement of a metal piece.

FIG. 2 is a conceptual view illustrating placement of a metal piece. An electrode assembly 10 includes a positive electrode 11, a separator 13, and a negative electrode 12. Separator 13 is interposed between positive electrode 11 and negative electrode 12. Separator 13 separates positive electrode 11 from negative electrode 12. Separator 13 may be exposed at the outer surface of electrode assembly 10. To the outer surface of electrode assembly 10, an insulating film (not illustrated) may be affixed. In FIG. 2, the outer surface of electrode assembly 10 is formed of separator 13. On the outer surface of electrode assembly 10, a metal piece 20 is placed. The posture (orientation) of metal piece 20 is adjusted in such a way that the area of contact between metal piece 20 and electrode assembly 10 becomes maximum.

As long as it has a hardness equal to or less than that of a push jig 31 (described below), metal piece 20 may include any metal material. For example, metal piece 20 may include at least one selected from the group consisting of Al, Cu, Fe, Ni, and stainless steel (SUS). For example, metal piece 20 may be made of SUS. For example, the SUS may be any of SUS2XX (namely, those ranging from SUS200 to SUS299) (such as SUS201, for example), SUS3XX (such as SUS304, SUS316, for example), SUS4XX (such as SUS403, SUS430, for example), and SUS6XX (such as SUS630, SUS631). The notation such as "SUS304" is "Syurui no Kigou" (a symbol specifying the type) according to "JIS G 4303".

Figure 3:
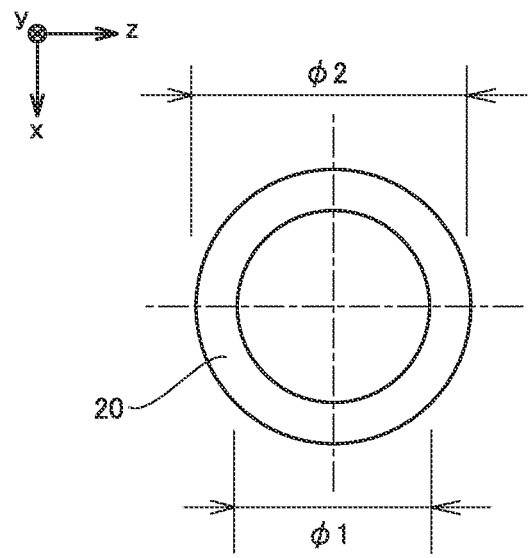
FIG. 3 is a schematic plan view illustrating the metal piece.

FIG. 3 is a schematic plan view illustrating the metal piece. Metal piece 20 has a ring shape. As long as it has a ring shape, the planar shape of metal piece 20 is not limited to circular. For example, the planar shape of metal piece 20 may be circular, elliptical, or polygonal (such as triangular, square, or hexagonal). When the planar shape is not circular, each of the inner diameter ($\varphi 1$) and the outer diameter ($\varphi 2$) of metal piece 20 refers to the maximum diameter in a plan view.

The planar shape of metal piece 20 may be continuous for the entire contour. The planar shape of metal piece 20 may be partially discontinuous. For example, the planar shape of metal piece 20 may be C-shaped.

The inner diameter ($\varphi 1$) of metal piece 20 may be 0.1 mm or more, or 0.3 mm or more, or 0.5 mm or more, or 0.7 mm or more, for example. The inner diameter ($\varphi 1$) of metal piece 20 may be 1.5 mm or less, or 1.3 mm or less, or 1.1 mm or less, or 1.3 mm or less, for example.

The outer diameter ($\varphi 2$) of metal piece 20 may be 0.3 mm or more, or 0.5 mm or more, or 0.7 mm or more, or 0.9 mm or more, for example. The outer diameter ($\varphi 2$) of metal piece 20 may be 2 mm or less, or 1.8 mm or less, or 1.6 mm or less, or 1.4 mm or less, for example.

The difference between the outer diameter and the inner diameter ($\varphi 2-\varphi 1$) may be 0.05 mm or more, or 0.1 mm, or 0.2 mm or more, or 0.3 mm or more, or 0.5 mm or more, for example. The difference between the outer diameter and the inner diameter ($\varphi 2-\varphi 1$) may be 0.9 mm or less, or 0.8 mm or less, or 0.7 mm or less, for example.

Figure 4:
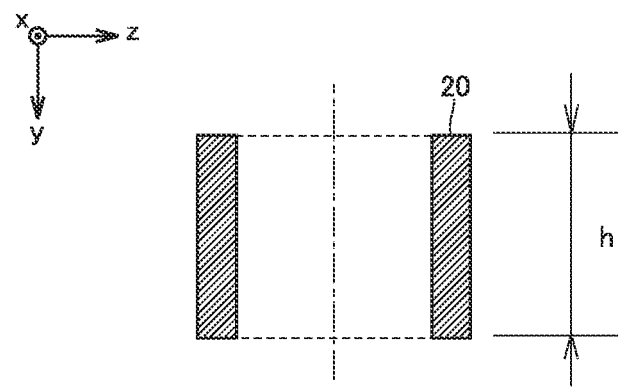
FIG. 4 is a schematic cross-sectional view illustrating the metal piece.

FIG. 4 is a schematic cross-sectional view illustrating the metal piece. The height (h) of metal piece 20 may be 0.2 mm or more, or 0.3 mm or more, or 0.4 mm or more, for example. The height (h) of metal piece 20 may be 0.5 mm or less, or 0.4 mm or less, for example.

<(b) Pushing Metal Piece>

The present evaluation method includes pushing metal piece 20 into electrode assembly 10. In the present evaluation method, a jig set 30 is used. Jig set 30 includes push jig 31 and a guide jig 32. Guide jig 32 has a through hole 32a. Guide jig 32 is placed on the outer surface of electrode assembly 10 in such a manner that metal piece 20 is accommodated inside through hole 32a. Push jig 31 is inserted into through hole 32a. For example, a servo press machine and/or the like is used to drive push jig 31 in the Y-axis direction so that push jig 31 presses metal piece 20. Guide jig 32 guides the movement of the push jig in the Y-axis direction. As push jig 31 pushes metal piece 20 out of through hole 32a, metal piece 20 is pushed into electrode assembly 10. Because push jig 31 presses metal piece 20 inside through hole 32a, unsuccessful pushing-into due to, for example, positional misalignment between push jig 31 and metal piece 20, and the like, may be reduced.

Push jig 31 has a rod shape. Push jig 31 may have a round-rod shape, or a square-rod shape, or a flat-rod shape, for example. The shape of a cross section of push jig 31 orthogonal to the axial direction may be similar to the planar shape (the shape of an end face) of metal piece 20.

Push jig 31 is electrically conductive. For example, push jig 31 may include at least one selected from the group consisting of a metal material, a carbon material, an electrically-conductive resin material, an electrically-conductive ceramic material, and the like. The electrically-conductive resin material may be a resin material that has electrical conductivity. The electrically-conductive resin material may be a conductive material (such as a carbon material) dispersed in a matrix resin. The electrically-conductive ceramic material may be a ceramic material that has electrical conductivity. The electrically-conductive ceramic material may be a mixture of a ceramic material and a conductive material (such as a carbon material). Push jig 31 may be produced by any method. For example, push jig 31 may be produced by an extrusion process, a drawing process, a bending process, a welding process, and/or the like. Push jig 31 may be a composite component. For example, push jig 31 may be produced by covering a rod-shaped insulation material with a conductive material.

The material (a constituent material) included by push jig 31 may have a resistivity of 1 $\Omega$cm or less, or $10^{-2}$ $\Omega$cm or less, or $10^{-4}$ $\Omega$cm or less, or $10^{-6}$ $\Omega$cm or less, for example.

Push jig 31 is as hard as or harder than metal piece 20. More specifically, the relationship of the following expression (1) is satisfied.

$$H_0 \le H_1 \tag{1}$$

$H_0$: Hardness of metal piece 20
$H_1$: Hardness of push jig 31

The hardness ratio ($H_1/H_0$) is determined by dividing the hardness of push jig 31 by the hardness of metal piece 20. The hardness ratio ($H_1/H_0$) derived from the above expression (1) is 1 or more. For example, the hardness ratio ($H_1/H_0$) may be 1.1 or more, or 1.2 or more, or 1.5 or more, or 2 or more, or 3 or more. For example, the hardness ratio ($H_1/H_0$) may be 3 or less, or 2 or less, or 1.5 or less, or 1.2 or less, or 1.1 or less.

Each of $H_0$ and $H_1$ may be a Vickers hardness. Each of $H_0$ and $H_1$ may be 150 HV or more. For example, the relationship of the following expression (2) may be satisfied.

$$50\ HV \le (H_1 - H_0) \tag{2}$$

For example, $H_1$ may be 200 HV or more, or 300 HV or more, or 400 HV or more. For example, $H_1$ may be 600 HV or less, or 400 HV or less, or 300 HV or less. For example, $H_0$ may be from 50 to 200 HV, or from 100 to 200 HV, or from 150 to 200 HV.

As long as it is as hard as or harder than metal piece 20, push jig 31 may include any material. For example, push jig 31 may include at least one selected from the group consisting of Al, Cu, Fe, Ni, and SUS. For example, push jig 31 may be formed of a material that is different from that of metal piece 20. For example, push jig 31 may be formed of the same material as metal piece 20. When push jig 31 is formed of the same material as metal piece 20, the hardness of push jig 31 may be the same as that of metal piece 20. For example, both the push jig 31 and the metal piece 20 may be made of SUS304. For example, push jig 31 may be made of SUS630 and metal piece 20 may be made of SUS304. For example, push jig 31 may be made of SUS440C and metal piece 20 may be made of SUS304. For example, the push jig may be made of SUS304 and metal piece 20 may be made of a 2XXX Al. "2XXX Al" refers to Al materials of Alloy Nos. 2XXX (ranging from 2000 to 2999) specified by "JIS H 4000".

A constituent material of push jig 31 may have a low specific heat. The lower the specific heat of the constituent material is, the more reduced the heat capacity of push jig 31 may be. The lower the heat capacity is, the more reduced the heat escape to push jig 31 tends to be. For example, the specific heat of the constituent material may be 1 kJ/(kg·K) or less, or 0.9 KJ/(kg·K) or less, or 0.8 KJ/(kg·K) or less, or 0.7 kJ/(kg·K) or less, or 0.6 kJ/(kg·K) or less, or 0.5 kJ/(kg·K) or less, or 0.4 kJ/(kg·K) or less, or 0.3 kJ/(kg·K) or less, or 0.2 kJ/(kg·K) or less, or 0.1 kJ/(kg·K) or less. For example, the specific heat of the constituent material may be 0.1 kJ/(kg·K) or more, or 0.2 kJ/(kg·K) or more, or 0.3 kJ/(kg·K) or more, or 0.4 kJ/(kg·K) or more.

For example, the thermal conductivity of push jig 31 may be lower than that of metal piece 20. The lower the thermal conductivity of push jig 31 is, the more reduced the heat escape to push jig 31 tends to be. For example, the thermal conductivity of the constituent material of push jig 31 may be 100 W/(m·k) or less, or 75 W/(m·k) or less, or 50 W/(m·k) or less, or 25 W/(m·k) or less, or 10 W/(m·k) or less. For example, the thermal conductivity of the constituent material of push jig 31 may be 1 W/(m·k) or more, or 5 W/(m·k) or more, or 10 W/(m·k) or more.

Push jig 31 may be either a solid material or a hollow material. For example, when push jig 31 is a hollow material, heat capacity of push jig 31 may be reduced. For example, push jig 31 may have a hollow rod shape. For example, push jig 31 may have a hollow tubular shape. For example, the hollow portion may extend through push jig 31 in the axial direction (the longitudinal direction). In the axial direction of push jig 31, the hollow portion may be open at both end faces, or may be open at one of the end faces. Push jig 31 may press metal piece 20 at an end face where the hollow portion is open. As long as it is capable of pushing metal piece 20, push jig 31 is not particularly limited in terms of the hollow rate. "Hollow rate" refers to the percentage of the volume of the hollow portion relative to the apparent volume of push jig 31. The apparent volume refers to the volume determined from the outer diameter dimensions. The apparent volume includes the volume of a hollow portion 31a. For example, the hollow rate may be 1% or more, or 5% or more, or 10% or more, or 25% or more, or 50% or more, or 75% or more. For example, the hollow rate may be 75% or less, or 50% or less, or 25% or less, or 10% or less, or 5% or less, or 1% or less.

Figure 5:
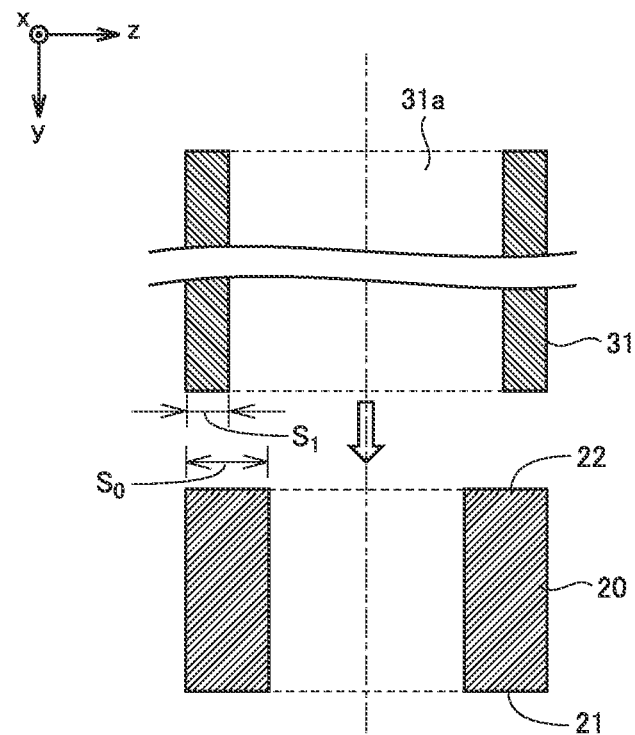
FIG. 5 is a descriptive view illustrating the area of contact between a push jig and a metal piece.

FIG. 5 is a descriptive view illustrating the area of contact between the push jig and the metal piece. Metal piece 20 includes a first end face 21 and a second end face 22. Second end face 22 is a face opposite to first end face 21. Each of first end face 21 and second end face 22 may be independently either a flat face or a curved face. Metal piece 20 is pushed into electrode assembly 10 from the first end face 21 side. Push jig 31 has hollow portion 31a. Push jig 31 comes into contact with second end face 22. Second end face 22 is pressed by push jig 31. The area of contact between push jig 31 and second end face 22 may be smaller than the area of second end face 22.

More specifically, the relationship of the following expression (3) may be satisfied.

$$S_1 < S_0 \qquad (3)$$

$S_0$: Area of second end face 22
$S_1$: Area of contact between push jig 31 and second end face 22

In the cross-sectional view of FIG. 5, for the sake of convenience, the difference in area is expressed as the difference in length.

The area ratio ($S_1/S_0$) is determined by dividing the area of contact between push jig 31 and second end face 22 by the area of second end face 22. When the relationship of the above expression (3) is satisfied, the area ratio ($S_1/S_0$) is less than 1.

The smaller the area ratio is, the less likely the heat escape to push jig 31 is expected to occur. For example, the area ratio ($S_1/S_0$) may be 0.9 or less, or 0.8 or less, or 0.7 or less, or 0.6 or less, or 0.5 or less, or 0.4 or less, or 0.3 or less, or 0.2 or less, or 0.1 or less. For example, the area ratio ($S_1/S_0$) may be 0.1 or more, or 0.2 or more, or 0.3 or more, or 0.4 or more, or 0.5 or more, or 0.6 or more, or 0.7 or more, or 0.8 or more, or 0.9 or more.

Figure 6:
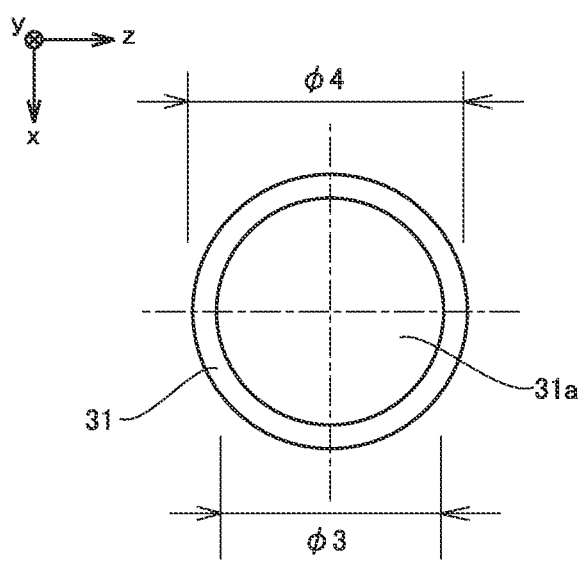
FIG. 6 is a first example of the shape of an end face of the push jig.

FIG. 6 is a first example of the shape of an end face of the push jig. For example, push jig 31 may have a single hollow portion 31a. For example, the outer diameter (φ4) of push jig 31 may be equal to the outer diameter (φ2) of metal piece 20. For example, the outer diameter (φ4) of push jig 31 may be different from the outer diameter (φ2) of metal piece 20. For example, the inner diameter (φ3) of push jig 31 may be larger than the inner diameter (φ2) of metal piece 20.

Figure 7:
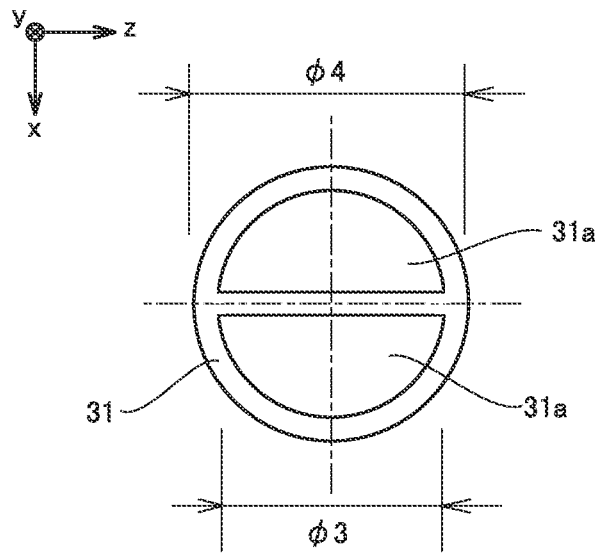
FIG. 7 is a second example of the shape of an end face of the push jig.

FIG. 7 is a second example of the shape of an end face of the push jig. For example, push jig 31 may have a plurality of hollow portions 31a. Each hollow portion 31a may extend in the axial direction of push jig 31 (in the Y-axis direction). Hollow portions 31a may be parallel to one another.

Figure 8:
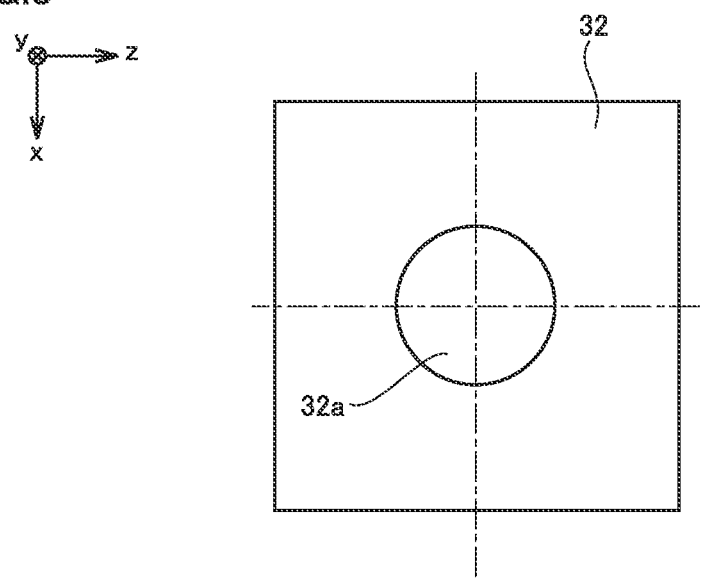
FIG. 8 is a schematic plan view illustrating a guide jig.

FIG. 8 is a schematic plan view illustrating a guide jig. For example, guide jig 32 may also be called "a push jig guide", "a sleeve", and the like. Guide jig 32 has through hole 32a. The planar shape of guide jig 32 is not particularly limited. Guide jig 32 may have a shape and a size that are suitable for stable placement on the outer surface of electrode assembly 10. For example, the planar shape of guide jig 32 may be rectangular, circular, and/or the like.

Guide jig 32 has through hole 32a. The planar shape of through hole 32a may be similar to the planar shape (the shape of an end face) of metal piece 20. The planar shape of through hole 32a may be similar to the shape of an end face of push jig 31. The clearance is designed so that push jig 31 is capable of sliding inside the through hole 32a. The clearance refers to the difference between the outer diameter of push jig 31 and the inner diameter of through hole 32a.

Guide jig 32 may include any material. For example, guide jig 32 may include at least one selected from the group consisting of a metal material, a ceramic material, and a resin material. For example, guide jig 32 may include at least one selected from the group consisting of phenolic resin (bakelite), polyvinyl chloride, acrylic resin, polyethylene terephthalate, fluororesin, nylon, polypropylene, and polyethylene.

<(c) Detecting Short Circuit>

Figure 9:
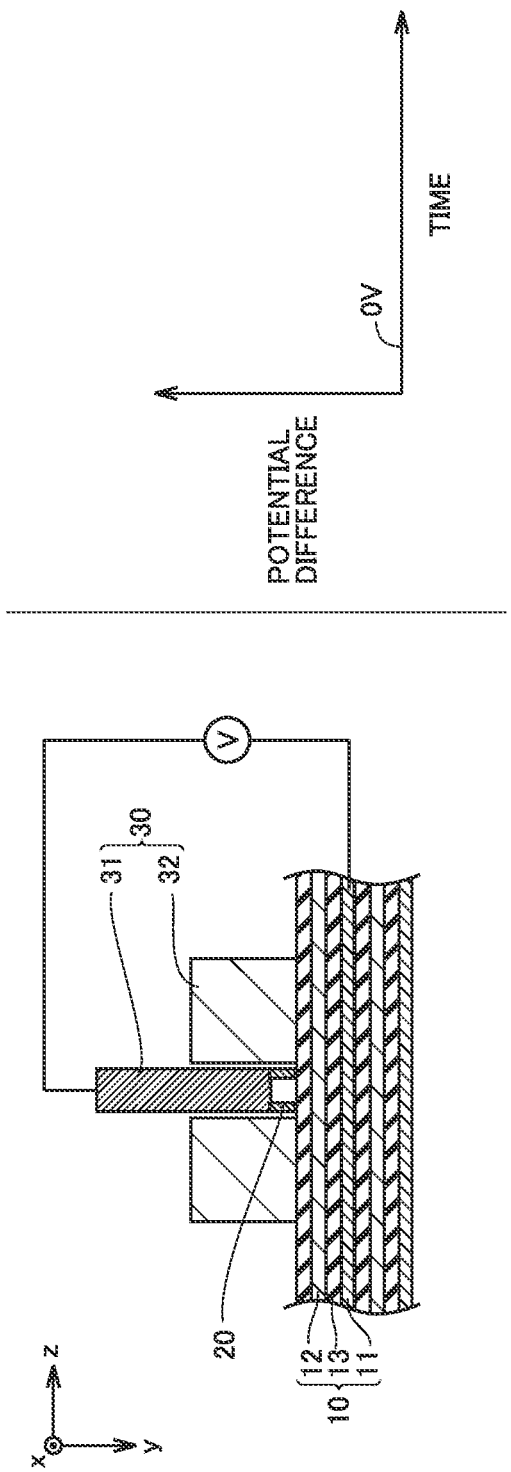
FIG. 9 is a first conceptual view illustrating detection of a short circuit.

FIG. 9 is a first conceptual view illustrating detection of a short circuit. The present evaluation method includes detecting a short circuit based on a change in potential difference between an electrode inside electrode assembly 10 and metal piece 20. The potential difference between positive electrode 11 and metal piece 20 may be measured, or the potential difference between negative electrode 12 and metal piece 20 may be measured. For example, in electrode assembly 10, the potential difference between the second outermost electrode layer and metal piece 20 may be measured. In FIG. 9, the second outermost electrode layer is positive electrode 11. The potential difference is measured with a voltmeter. At the time when metal piece 20 is placed on the outer surface of electrode assembly 10, the potential difference is 0 V.

Figure 10:
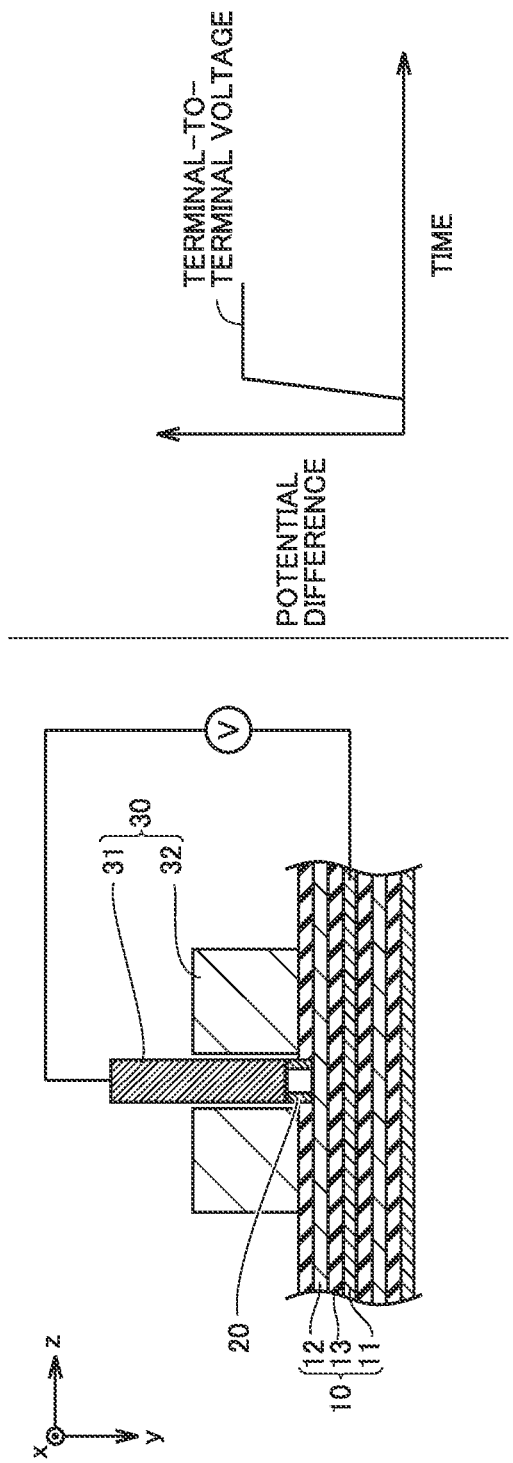
FIG. 10 is a second conceptual view illustrating detection of a short circuit.

FIG. 10 is a second conceptual view illustrating detection of a short circuit. Metal piece 20 is pushed into electrode assembly 10. When metal piece 20 comes into contact with negative electrode 12, a change in potential difference occurs. It is conceivable that the potential difference at the time when metal piece 20 has come into contact with negative electrode 12 is equal to the terminal-to-terminal voltage between positive electrode 11 and negative electrode 12.

Figure 11:
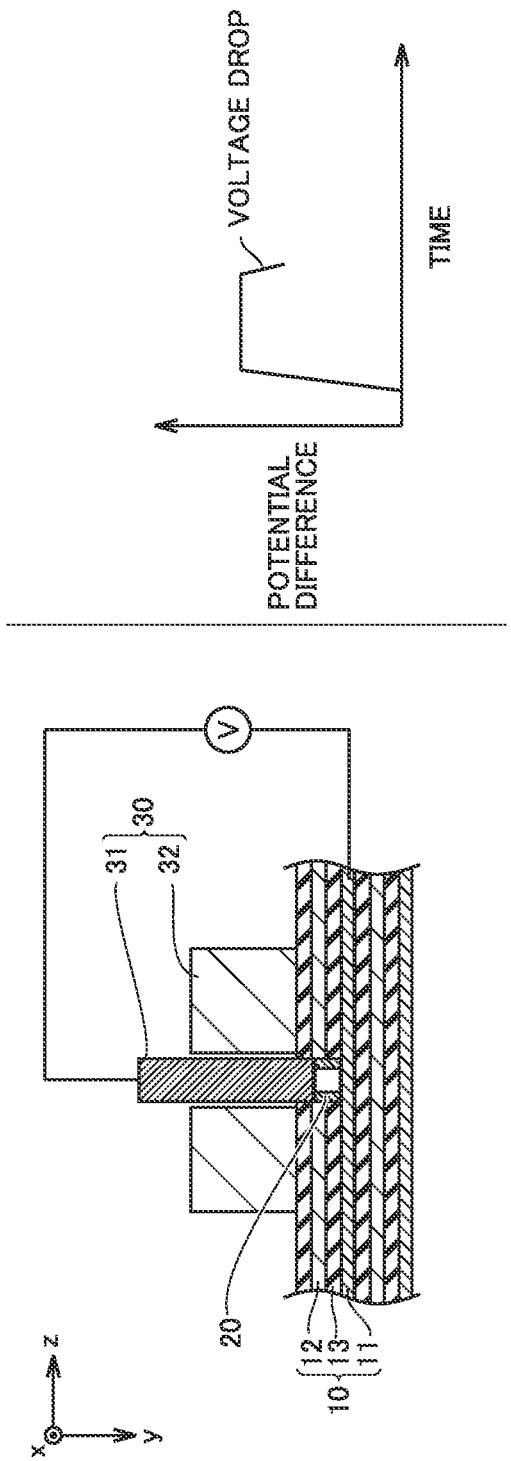
FIG. 11 is a third conceptual view illustrating detection of a short circuit.

FIG. 11 is a third conceptual view illustrating detection of a short circuit. Metal piece 20 is further pushed into, and thereby metal piece 20 penetrates through negative electrode 12. Subsequently, metal piece 20 penetrates through separator 13. As a result of metal piece 20 penetrating through separator 13, metal piece 20 comes into contact with positive electrode 11. At this point, as a result of metal piece 20 penetrating through a single separator layer 13, negative electrode 12 and positive electrode 11 are short-circuited. That is, a single-layer short circuit has occurred.

As a result of metal piece 20 coming into contact with positive electrode 11, the potential difference decreases. That is, it is possible to detect a single-layer short circuit based on a change in potential difference. It is conceivable that a decrease in potential difference occurs as a result of the potential of metal piece 20 becoming equal to that of positive electrode 11. It is conceivable that the decrement of potential difference tends not to depend on the capacity of the power storage device. For example, at the time when a decrease in potential difference of at least 2 mV is observed, it may be judged that a short circuit has occurred.

The pushing rate is not particularly limited. However, the lower the pushing rate is, the smaller the time lag between short circuit detection and stopping pushing. For example, the pushing rate may be 1 mm/s or less, or 0.1 mm/s or less, or 0.05 mm/s or less, or 0.01 mm/s or less. For example, the pushing rate may be 0.001 mm/s or more, or 0.005 mm/s or more, or 0.01 mm/s or more.

<(d) Stopping Pushing>

The present evaluation method includes stopping the action of pushing the metal piece. Pushing the metal piece may be stopped immediately after detection of a short circuit.

After the pushing is stopped, the state of electrode assembly 10 is checked. Based on the state of electrode assembly 10, the power storage device may be evaluated. The checking of the state may be continued for a predetermined period of time. For example, the checking duration may be 1 minute or more, or 1 hour or more, or 3 hours or more, or 6 hours or more. For example, the checking duration may be 24 hours or less, or 12 hours or less.

For example, "the state of the electrode assembly" may include at least one selected from the group consisting of appearance, surface temperature, and terminal-to-terminal voltage. For example, the appearance may be checked by visual examination. The appearance may be recorded on a recording apparatus. For example, a change in appearance may be in the form of discoloration and/or smoking. For example, the presence or absence of an appearance change, the extent of the appearance change, and/or the like may be used to evaluate whether the power storage device is failed or not.

For example, the surface temperature may be measured with a temperature sensor and/or the like. For example, the temperature sensor may include a thermocouple, a thermography, and/or the like. For example, the surface temperature may be used to evaluate whether the power storage device is failed or not. The terminal-to-terminal voltage may be measured with a voltmeter.

<Method of Producing Power Storage Device>

Figure 12:
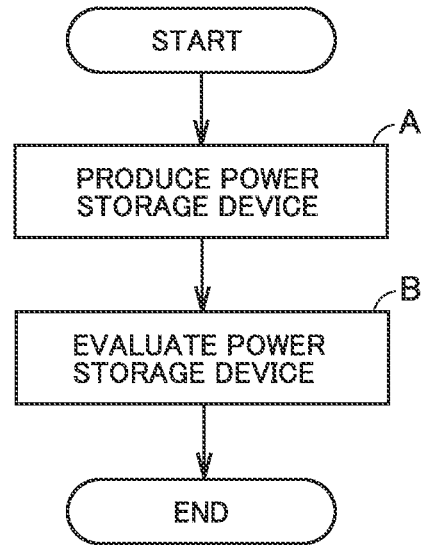
FIG. 12 is a schematic flowchart illustrating a method of producing a power storage device according to the present embodiment.

FIG. 12 is a schematic flowchart illustrating a method of producing a power storage device according to the present embodiment. Hereinafter, "the method of producing a power storage device according to the present embodiment" may also be simply called "the present production method". The present production method includes "(A) producing a power storage device" and "(B) evaluating the power storage device".

<(A) Producing Power Storage Device>

The present production method includes producing a power storage device. A single power storage device may be produced, or a plurality of power storage devices may be produced. For example, a plurality of power storage devices having the same specifications may be produced. For example, power storage devices having different specifications may be produced.

<(B) Evaluating Power Storage Device>

The present production method includes evaluating the power storage device. Each power storage device is evaluated by the present evaluation method as described above. For example, the present evaluation method may be utilized in sampling inspection and/or the like during production of the power storage device. For example, one or more power storage devices may be taken out from a production lot. For example, evaluation results of the one or more power storage devices may be used to evaluate whether the production lot is failed or not.

For example, the present evaluation method may be utilized in specifications determination and/or the like during development of the power storage device. For example, a plurality of power storage devices of the same specifications may be produced. For example, evaluation results of one or more power storage devices may be used to evaluate whether the specifications are a failure or not.

<Power Storage Device>

In the following, the power storage device will be described in detail. "Power storage device" refers to a device that is capable of storing electrical energy. The specific configuration and the structure of the power storage device are not particularly limited. For example, the power storage device may be "a battery". For example, the battery may be either a primary battery or a secondary battery. For example, the battery may be any of a lead battery, a nickel-cadmium battery, a nickel-metal hydride battery, a nickel-zinc battery, a lithium-ion battery, a sodium-ion battery, a lithium primary battery, or the like.

For example, the battery may be any of a liquid-type battery, a polymer battery, or an all-solid-state battery. The battery may include at least one selected from the group consisting of a liquid electrolyte (an electrolyte solution), a gelled electrolyte, and a solid electrolyte.

For example, the power storage device may be "a capacitor". For example, the capacitor may be either a lithium-ion capacitor or an electric double-layer capacitor.

For example, the power storage device may be either of a monopolar (unipolar) type or of a bipolar type.

The power storage device includes an electrode assembly. The power storage device may further include an exterior member. "Exterior member" is a member that is capable of accommodating the electrode assembly. For example, the exterior member may also be called a housing, a case, a can, and the like. For example, the exterior member may include a container made of metal. For example, the exterior member may include a pouch made of a metal foil laminated film, and the like.

"Electrode assembly" is a group of electrodes. For example, the electrode assembly may also be called an electrode group, an electrode body, an assembly of electrodes, an electrode winding assembly, an electrode stack, and the like. The electrode assembly includes a positive electrode, a separator, and a negative electrode. The separator is interposed between the positive electrode and the negative electrode. The separator separates the positive electrode from the negative electrode.

Figure 13:
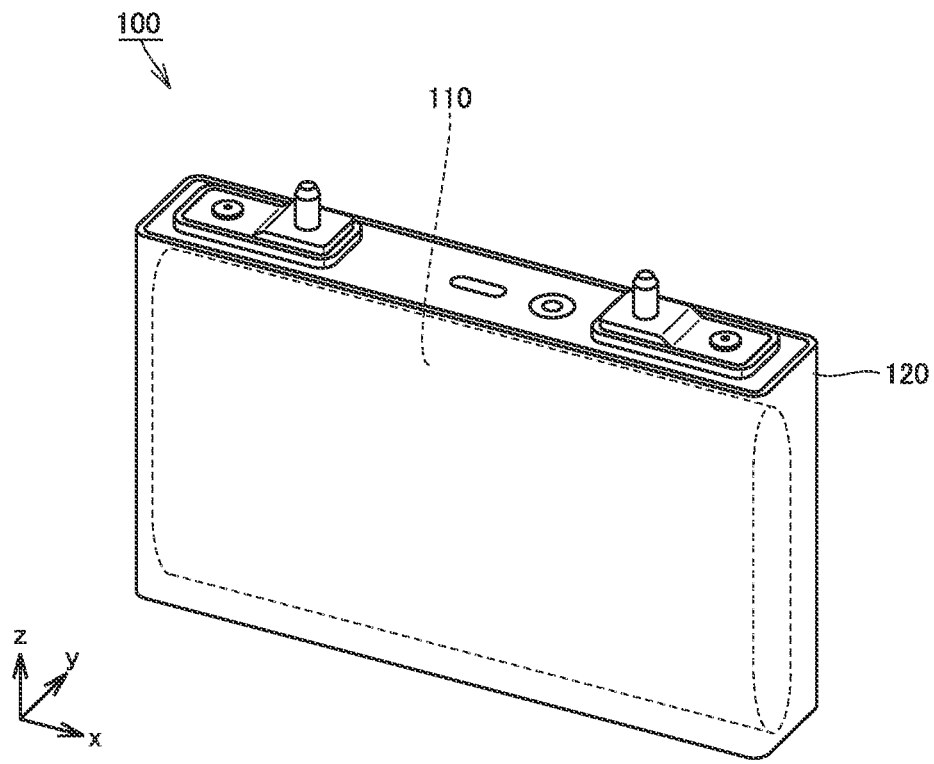
FIG. 13 is a schematic view illustrating a prismatic battery.

FIG. 13 is a schematic view illustrating a prismatic battery. A prismatic battery 100 is an example of the power storage device. Prismatic battery 100 includes an electrode assembly 110 and an exterior member 120. Exterior member 120 is a container having a prismatic shape. The "prismatic" shape refers to a rectangular parallelepiped. For example, exterior member 120 may be made of a metal material. For example, exterior member 120 may be made of Al, or made of an Al alloy or the like, or may be made of SUS, or may be made of Fe, or may be made of a resin material. For example, exterior member 120 may be equipped with a liquid inlet hole, a gas-discharge valve, a CID (Current Interrupt Device), and/or the like. Exterior member 120 is hermetically sealed. Exterior member 120 accommodates electrode assembly 110.

Figure 14:
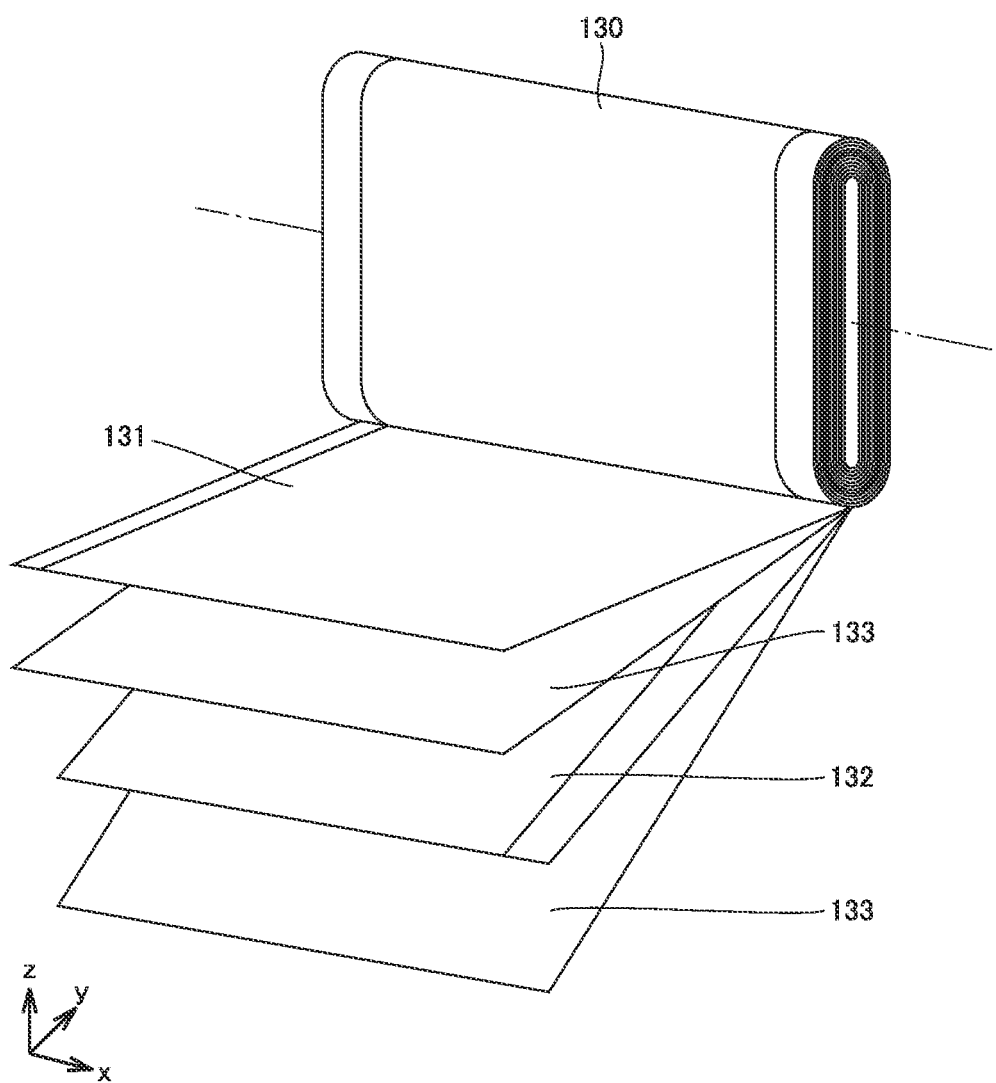
FIG. 14 is a schematic view illustrating an electrode winding assembly.

FIG. 14 is a schematic view illustrating an electrode winding assembly. Electrode assembly 110 may be an electrode winding assembly 130. Electrode winding assembly 130 includes a positive electrode 131, a negative electrode 132, and a separator 133. Each of positive electrode 131, negative electrode 132, and separator 133 is a belt-shaped sheet. Electrode winding assembly 130 may include two separators 133. For example, positive electrode 131, separator 133 (first one), negative electrode 132, and separator 133 (second one) may be stacked in this order to form a stack. The resulting stack may be wound spirally to form electrode winding assembly 130. For example, electrode winding assembly 130 may be shaped into a flat form by pressing. For example, electrode winding assembly 130 is impregnated with an electrolyte solution.

For example, positive electrode 131 includes a positive electrode current collector and a positive electrode active material layer. For example, the positive electrode current collector may include a metal foil and/or the like. For example, the positive electrode current collector may include an Al foil and/or the like. The positive electrode active material layer may be placed on the surface of the positive electrode current collector. The positive electrode active material layer includes a positive electrode active material. For example, in addition to a positive electrode active material, the positive electrode active material layer may further include a conductive material, a binder, and the like. For example, in a lithium-ion battery, the positive electrode active material may include a lithium-containing transition metal composite oxide (such as $LiNi_{1/3}Co_{1/3}Mn_{1/3}O_2$, $LiNi_{0.8}Co_{0.15}Al_{0.05}O_2$, for example).

For example, negative electrode 132 includes a negative electrode current collector and a negative electrode active material layer. For example, the negative electrode current collector may include a metal foil and/or the like. The negative electrode active material layer may be placed on the surface of the negative electrode current collector. The negative electrode active material layer includes a negative electrode active material. For example, in addition to a negative electrode active material, the negative electrode active material layer may further include a conductive material, a binder, and the like. For example, in a lithium-ion battery, the negative electrode active material may include graphite and/or the like.

For example, separator 133 may include a porous film. For example, the porous film may be made of polyethylene (PE), or may be made of polypropylene (PP), or may be made of polyamide (PA). The porous film may have a multilayer structure. For example, the porous film may be formed by stacking a PP layer, a PE layer, and a PP layer in this order.

For example, in addition to the porous film, separator 133 may further include a ceramic layer and/or the like. For example, the ceramic layer may be placed on the surface of the porous film. For example, the ceramic layer includes a ceramic material and a binder. For example, the ceramic material may include alumina, boehmite, and/or the like.

Figure 15:
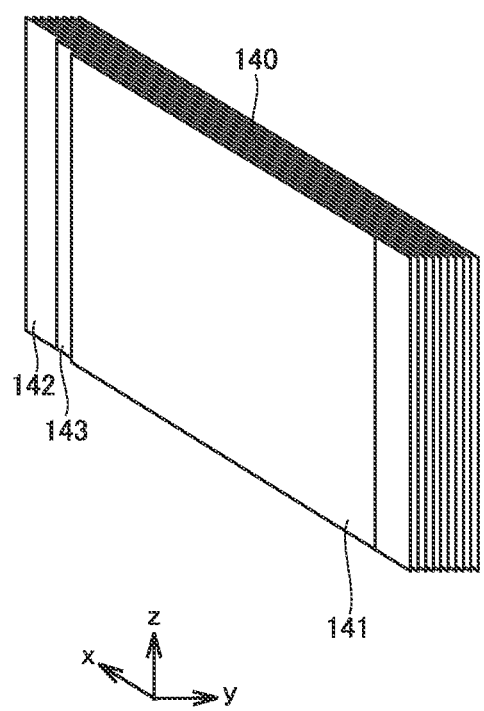
FIG. 15 is a schematic view illustrating an electrode stack.

FIG. 15 is a schematic view illustrating an electrode stack. Electrode assembly 110 may be an electrode stack 140. Electrode stack 140 includes a positive electrode 141, a negative electrode 142, and a separator 143. Each of positive electrode 141, negative electrode 142, and separator 143 is a rectangular sheet. Positive electrode 141 and negative electrode 142 may be alternately stacked to form electrode stack 140. Separator 143 is interposed between every pair of positive electrode 141 and negative electrode 142. For example, electrode stack 140 is impregnated with an electrolyte solution.

Figure 16:
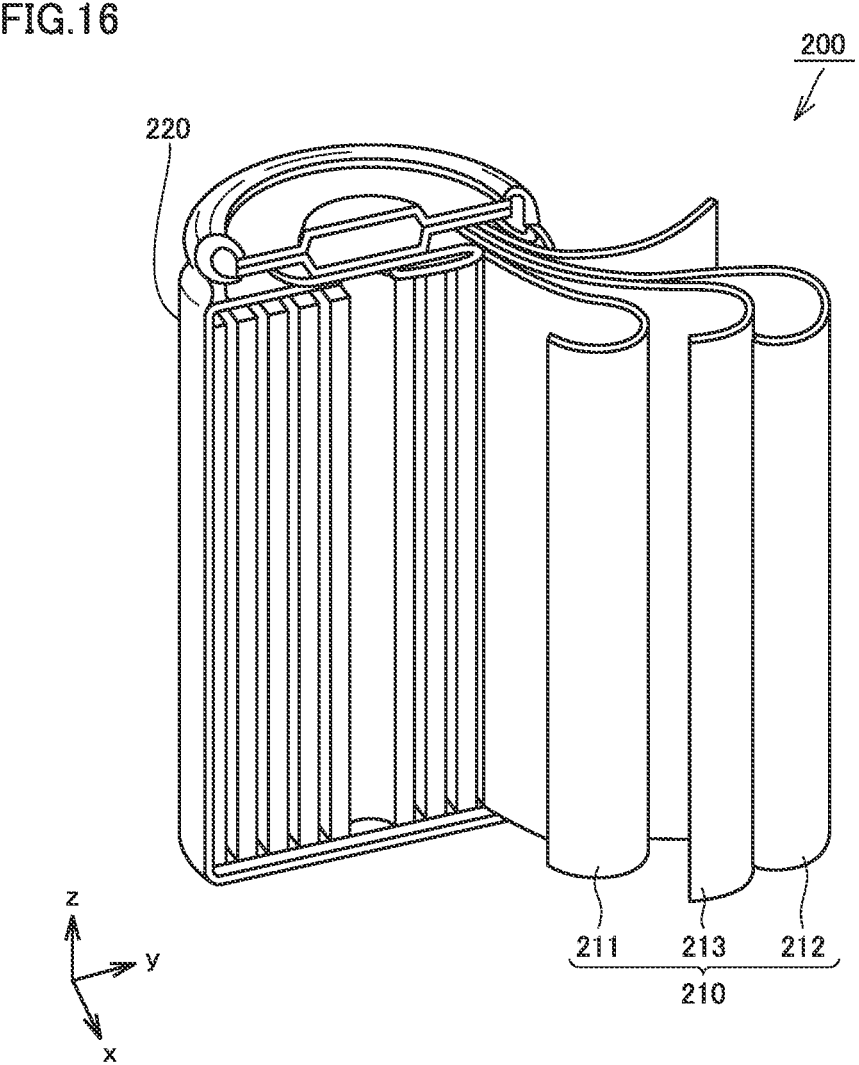
FIG. 16 is a schematic view illustrating a cylindrical battery.

FIG. 16 is a schematic view illustrating a cylindrical battery. A cylindrical battery is an example of the power storage device. A cylindrical battery 200 includes an electrode assembly 210 and an exterior member 220. Exterior member 220 is a cylindrical container. For example, exterior member 220 may be made of SUS, or may be made of Fe, or may be made of a resin material. Exterior member 220 is hermetically sealed. Exterior member 220 accommodates electrode assembly 210. Electrode assembly 210 includes a positive electrode 211, a negative electrode 212, and a separator 213. For example, electrode assembly 210 may be an electrode winding assembly. For example, electrode assembly 210 may be wound in a tubular shape.

Figure 17:
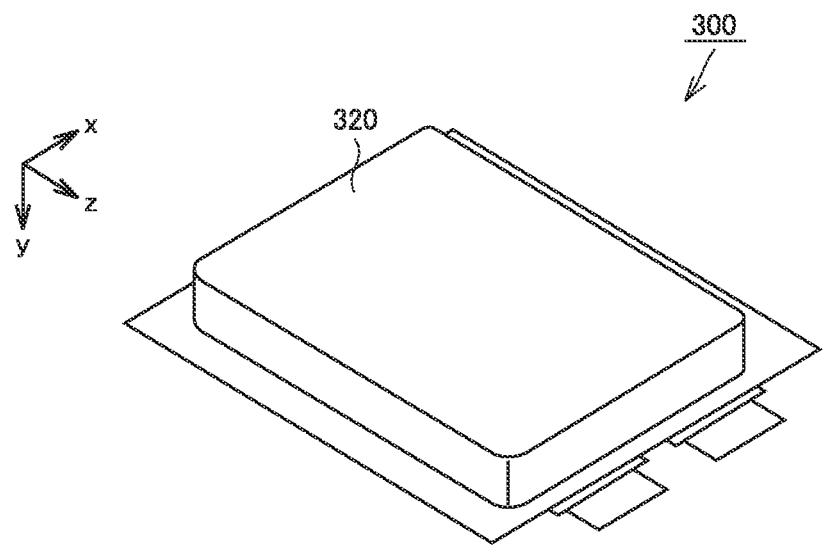
FIG. 17 is a schematic view illustrating a pouch-type battery.

FIG. 17 is a schematic view illustrating a pouch-type battery. A pouch-type battery is an example of the power storage device. For example, a pouch-type battery may also be called "a laminate-type battery" and the like. A pouch-type battery 300 includes an exterior member 320 and an electrode assembly. Exterior member 320 is a pouch made of an aluminum-laminated film. For example, the pouch is hermetically sealed by heat sealing. Exterior member 320 accommodates the electrode assembly. For example, the electrode assembly may be an electrode winding assembly. For example, the electrode assembly may be an electrode stack.

Figure 18:
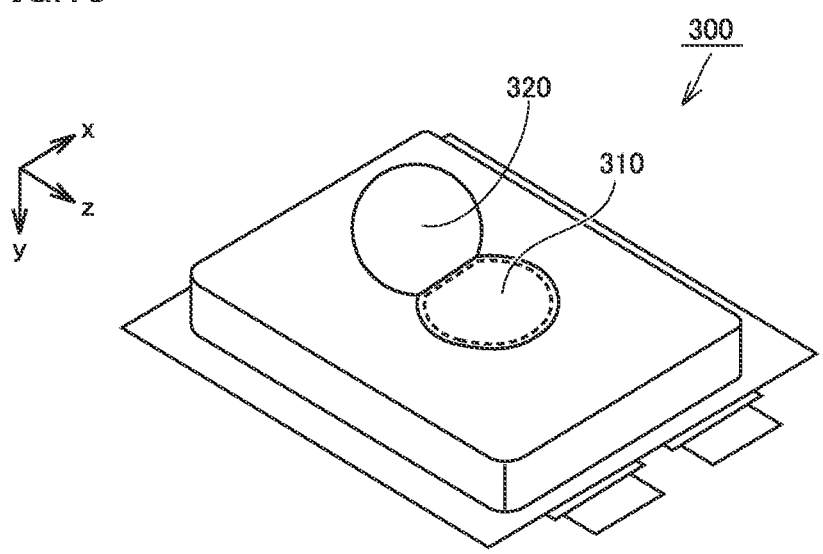
FIG. 18 is a schematic view illustrating an example of opening an exterior member.

FIG. 18 is a schematic view illustrating an example of opening an exterior member. For example, as described above, a portion of exterior member 320 may be removed to expose a portion of an electrode assembly 310. To the exposed portion of electrode assembly 310, metal piece 20 may be placed.

EXAMPLES

FIG. 19 is a table showing the configuration of test products. Power storage devices having the configuration specified in FIG. 19 were prepared.

FIG. 20 is a table showing experiment results. In the manner specified in No. 1 to No. 4, short-circuit testing was carried out. The short-circuit testing was carried out for 10 power storage device cells of respective configurations ranging from 5 Ah to 200 Ah. After testing, the power storage device was disassembled, and the number of short-circuited layers and the melt diameter were evaluated.

"The number of short-circuited layers" refers to the number of separator layers through which the metal piece penetrated. For example, in the column "Number of short-circuited layers" of FIG. 20, "1 (10/10)" means that the number of short-circuited layers was one in 10 out of 10 tests. For example, "1 (7/10), 0 (3/10)" means that the number of short-circuited layers was one in 7 out of 10 tests and the number of short-circuited layers was zero (no short circuit) in 3 tests.

For example, in the column "Melt diameter" of FIG. 20, "Φ (7/10), 0 (3/10)" means that a hole having a diameter of Φ (unit, mm) was formed in the separator in 7 out of 10 tests and no hole was formed in the separator in 3 tests. For example, "2Φ (10/10)" means that a hole having a diameter of 2Φ (twice the diameter Φ) was formed in the separator in 10 out of 10 tests.

In the column "Voltage decrement" of FIG. 20, "δ" means a voltage decrement of 2 mV or more. "N" means that the voltage decrement was less than 2 mV. For example, "δ (7/10), N (3/10)" means that a voltage decrement of δ (unit, mV) was observed in 7 out of 10 tests and a voltage decrement of less than 2 mV was observed in 3 tests. For example, "0.5δ" means 0.5 times the amount δ.

<No. 1>

No. 1 was carried out in accordance with "Forced internal short circuit test" specified by IEC62660-3. The metal piece was L-shaped (made of Ni). The height of the metal piece was 0.2 mm, the length of each side of the L shape was 1 mm (the total length was 2 mm), and the width of the metal piece was 0.1 mm. The push jig was a block made of acrylic resin (5 mm×5 mm). The pushing rate was 0.01 mm/s. In No. 1, a terminal-to-terminal voltage decrement of 2 mV or more was regarded as indicating an occurrence of a short circuit. However, in No. 1, even with a terminal-to-terminal voltage decrement of less than 2 mV, when the pushing load reached 400 N, pushing was stopped. For example, "Number of short-circuited layers" of FIG. 20 indicates that, in No. 1, there is a tendency that as the capacity of the power storage device increased, short-circuiting became less likely to occur.

<No. 2>

No. 2 was carried out in accordance with the method of evaluating a power storage device described by Japanese Patent Laying-Open No. 2020-191181. The metal piece had a ring shape (made of SUS). The push jig was a rod made of bakelite. The pushing rate was 0.01 mm/s. In No. 2, a terminal-to-terminal voltage decrement of 2 mV or more was regarded as indicating an occurrence of a short circuit. However, in No. 2, even with a terminal-to-terminal voltage decrement of less than 2 mV, when the pushing load reached 400 N, pushing was stopped. For example, "Number of short-circuited layers" of FIG. 20 indicates that, in No. 2, there is a tendency that as the capacity of the power storage device increased, the number of short-circuited layers increased.

<No. 3>

No. 3 was carried out in accordance with the present evaluation method. The metal piece had a ring shape (made of SUS). The push jig was a solid rod made of metal. The pushing rate was 0.01 mm/s. In No. 3, a decrease in potential difference between the positive electrode and the metal piece was regarded as indicating an occurrence of a short circuit. "Number of short-circuited layers" of FIG. 20 indicates that, in No. 3, single-layer short-circuiting was maintained even when the capacity of the power storage device increased. That is, reproducibility of single-layer short-circuiting was improved.

Figure 21:
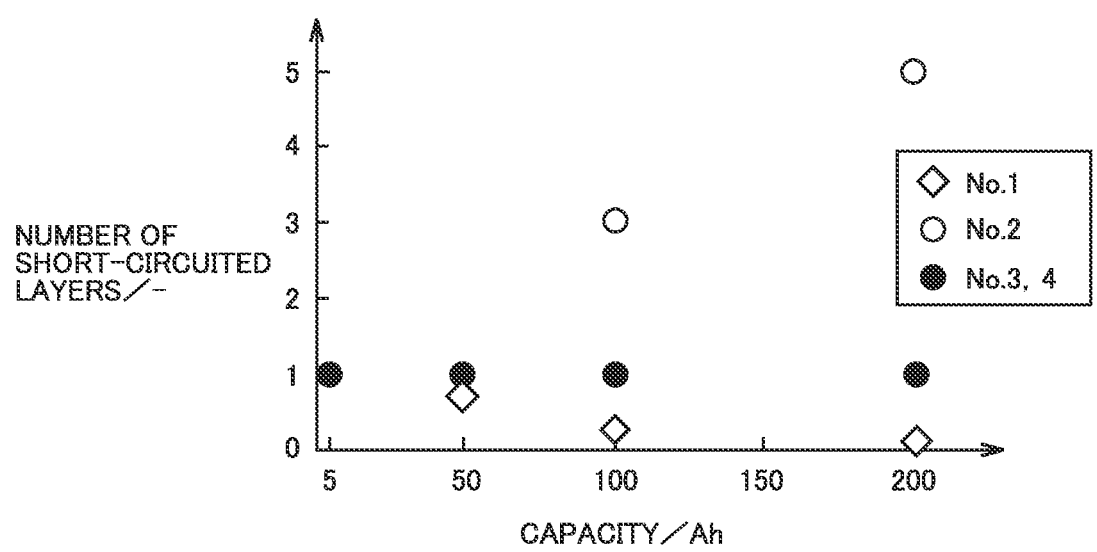
FIG. 21 is a graph showing the relationship between the average number of short-circuited layers and the capacity of the power storage device.

FIG. 21 is a graph showing the relationship between the average number of short-circuited layers and the capacity of the power storage device. At a capacity of 50 Ah or more, No. 1 and No. 2 are markedly different from single-layer short-circuiting. In contrast, in No. 3, a single-layer short circuit is reproduced stably.

<No. 4>

No. 4 was carried out in accordance with the present evaluation method. The metal piece had a ring shape (made of SUS). The push jig was a hollow rod made of metal. The pushing rate was 0.01 mm/s. In No. 4, a decrease in potential difference between the positive electrode and the metal piece was regarded as indicating an occurrence of a short circuit. "Number of short-circuited layers" of FIG. 20 indicates that, in No. 4, single-layer short-circuiting was maintained even when the capacity of the power storage device increased.

In No. 3, the push jig was a solid material. In contrast, in No. 4, the push jig was a hollow material. There is a tendency that the melt diameter in No. 4 was greater than that in No. 3. It may be because heat escape to a hollow material tends not to occur as compared to heat escape to a solid material.

There is a correlation between the melt diameter and the voltage decrement. More specifically, the greater the melt diameter is, the greater the voltage decrement (absolute value) tends to be. The greater the voltage decrement is, the more enhanced the accuracy of short circuit detection is expected to be.

What is claimed is:

1. A method of evaluating a power storage device including an electrode assembly, the method comprising, in the following order:
   (a) placing a metal piece on an outer surface of the electrode assembly;
   (b) pushing the metal piece into the electrode assembly;
   (c) detecting a short circuit based on a change in potential difference between an electrode inside the electrode assembly and the metal piece; and
   (d) stopping the pushing the metal piece,
   wherein
   the (b) includes using a push jig and a guide jig,
   the guide jig is provided with a through hole,
   the push jig is inserted into the through hole,
   the metal piece has a ring shape,
   the metal piece is placed inside the through hole,
   the push jig pushes the metal piece out of the through hole and thereby the metal piece is pushed into the electrode assembly,
   the push jig is electrically conductive, and
   a hardness of the push jig is equal to or more than a hardness of the metal piece.

2. The method of evaluating a power storage device according to claim 1, wherein the push jig has a hollow rod shape.

3. The method of evaluating a power storage device according to claim 1, wherein
   the metal piece has a first end face and a second end face,
   the second end face is a face opposite to the first end face,
   in the (b), the push jig comes into contact with the second end face, and
   an area of contact between the push jig and the second end face is smaller than an area of the second end face.

4. The method of evaluating a power storage device according to claim 1, wherein the push jig is made of metal.

5. A jig set used in the method of evaluating a power storage device according to claim 1, comprising the push jig and the guide jig.

6. A method of producing a power storage device, the method comprising, in the following order:
   (A) producing a power storage device; and
   (B) evaluating the power storage device,
   wherein
   the (B) includes the method of evaluating a power storage device according to claim 1.

\* \* \* \* \*